United States Patent

Chapman et al.

[15] 3,681,766

[45] Aug. 1, 1972

[54] FERROELECTRIC/PHOTO-CONDUCTOR STORAGE DEVICE WITH AN INTERFACE LAYER

[72] Inventor: Daniel W. Chapman, San Jose; Rajendra R. Mehta, Palo Alto, both of Calif.

[73] Assignee: International Business Machines Corporation, Armonk, N.Y.

[22] Filed: March 1, 1971

[21] Appl. No.: 119,977

[52] U.S. Cl.............250/211 R, 219 D; 340/173 LM

[51] Int. Cl.......................G11c 7/00, 11/22, 11/42

[58] Field of Search..................250/211 R, 219 D; 340/173 LM, 173.2

[56] References Cited

UNITED STATES PATENTS 3,350,506 10/1967 Chernow............340/173.2 X 3,229,261 1/1966 Fatuzzo..............340/173.2 X 2,905,830 9/1959 Kazan...............340/173.2 X

*Primary Examiner*—Bernard Konick

*Assistant Examiner*—Stuart Hecker

*Attorney*—Hanifin and Jancin; Melvyn D. Silver.

[57] ABSTRACT

A memory element for use in photoelectric data recording apparatus comprising a layered structure of a conductive substrate, ferroelectric material, discontinuous interface layer, photoconductor, and top conductive electrode. The top conductive electrode and discontinuous interface layer are chosen in conjunction with the photoconductor to act as blocking contacts in the dark and injecting contacts in the light. It is also desirable, although not essential, that the discontinuous interface layer make a blocking contact with the ferroelectric.

15 Claims, 2 Drawing Figures

*INVENTORS*
DANIEL W. CHAPMAN
RAJENDRA R. MEHTA
BY *Melvyn David Silver*
ATTORNEY

FERROELECTRIC/PHOTOCONDUCTOR STORAGE DEVICE WITH AN INTERFACE LAYER

FIELD OF THE INVENTION

Storage apparatus and elements in general, and photoelectric data recording apparatus and elements in particular where such elements are characterized by the combination of photoconductive and ferroelectric materials in a layered structure.

RELATION TO OTHER APPLICATIONS

This application relates to U.S. Pat. No. 3,148,354, issued Sept. 8, 1964, entitled "Photoelectric Recording Apparatus" by R. M. Schaffert, assigned to the assignee of this invention; and to application Ser. No. 119,973, entitled Improved Ferroelectric/Photoconductor Memory Element by D. W. Chapman, filed on Mar. 1, 1971, and assigned to the assignee of this invention, the teachings of which are incorporated into this application.

BACKGROUND OF THE INVENTION

This invention relates to an improved storage element for use in an apparatus for storing and retrieving information and particularly to a device in which information is stored and retrieved through the combined operation of electrical and photo phenomena.

Previous devices for storing information utilizing electrical and photo phenomena possess certain inherent disadvantages which limit their application. Among these disadvantages were relatively short storage life and loss of signal strength over extended periods of storage. In addition, special storage conditions and/or equipment were required.

One invention overcoming many prior art problems is described in U.S. Pat. No. 3,148,354, "Photoelectric Recording Apparatus," by Roland M. Schaffert, issued Sept. 8, 1964, and assigned to the same assignee as this invention. The Schaffert device utilizes the combination of ferroelectric and photoconductive phenomena for information storage and retrieval. Specifically, this is accomplished with a memory element having superimposed layers of photoconductive and ferroelectric materials interposed between a pair of conductive electrodes much in the style of a sandwich. The electrode in contact with the surface of the photoconductive layer is transparent to photoenergy. In the memory element, the photoconductive layer is sensitive to light while the ferroelectric layer is sensitive to changes in electric field. In accordance with the practice of that invention, the input or write-in is accomplished optically by exposing the photoconductive layer to photo pulses which, together with an applied voltage, produces switching of the domains of the ferroelectric layer in the selected areas exposed to the photo pulses. Read-out of the stored information is obtained by exposing the photoconductive layer to a photo beam, while a reverse applied voltage will produce a reswitching of the previously switched domains of the ferroelectric layer.

It has been discovered that as the Schaffert device is made in the form of thinner and thinner films, problems arise not initially anticipated in the Schaffert invention. These problems include decreased retention time for stored information in the ferroelectric, disturb pulse sensitivity, and asymmetrical functioning.

SUMMARY OF THE INVENTION

This invention utilizes the combination of ferroelectric and photoconductive phenomena for information storage and retrieval. Specifically, this is accomplished by use of an improved memory element in the aforesaid Schaffert apparatus. This memory element replaces that disclosed by Schaffert, and comprises a five layered structure of a top conductive electrode, in electrical contact with a photoconductive material, in electrical contact with a discontinuous interface layer, in electrical contact with a ferroelectric material, in electrical contact with a conductive substrate. This invention incorporates in this specification the entire specification of Schaffert, U.S. Pat. No. 3,148,354, and with the substitution of the memory element of this invention for that of Schaffert, otherwise operates in the various apparatus described in the aforesaid patent.

The top electrode and discontinuous interface layer are chosen to be compatible with the photoconductive material so as to be blocking contacts in the dark and injecting contacts in the light. It is also desirable, but not essential, that the interface layer form a blocking contact with the ferroelectric. In this manner, space charge buildup between the photoconductive and ferroelectric layers is eliminated. Further, storage retention is much improved, as is disturb sensitivity. An example of the combination of materials utilizable is gold or platinum for the top electrode and interface layer, gold or platinum for the conductive substrate, CdSe as the photoconductor, and $Pb_{0.92}Bi_{0.07}La_{0.01}(Fe_{0.405}Nb_{0.325}Zr_{.27})O_3$, the ferroelectric material described by Chapman, Journal of Applied Physics *40*, No. 6, pp. 2,381–2,385, May 1969. Other material combinations are detailed in the general description below.

In the Drawings

FIG. 1 is a cross-sectional view of a memory element adapted for practicing the Schaffert invention.

FIGS. 2*a–d* are schematic views illustrating the sequence of steps of the method of the Schaffert invention and showing the effects of the various operational steps on a memory element illustrated in cross-section.

Figure 7A:
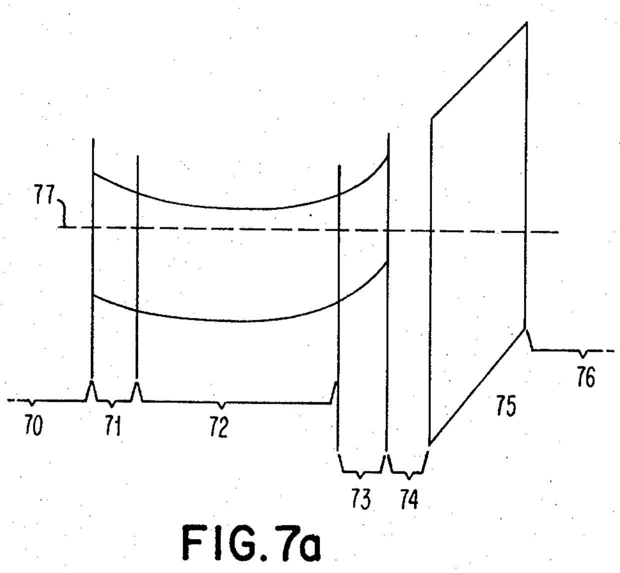
Figure 7B:
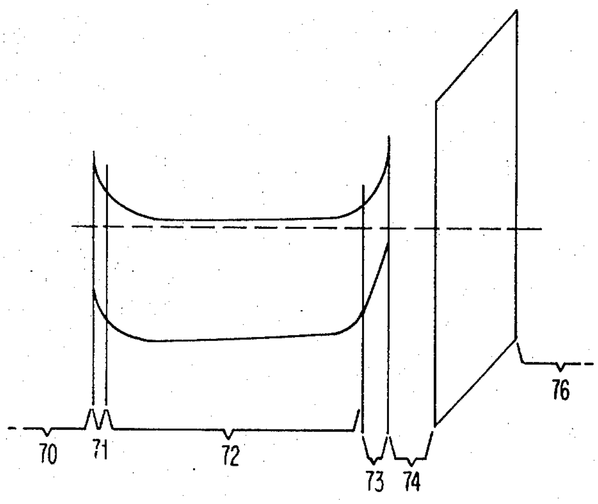

FIGS. 7*a–b* show a schematic of an energy band diagram of the memory element of this invention under dark and light conditions.

Figure 8:
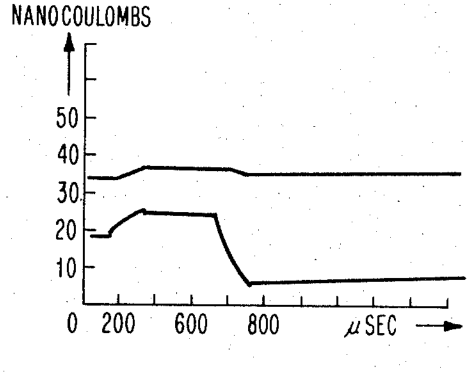
Figure 9:
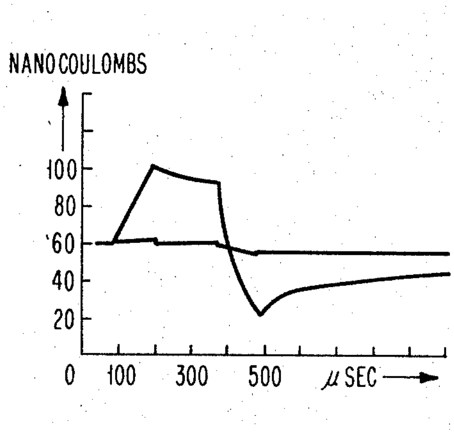

FIGS. 8 and 9 show the wave form of devices made by a thin film, the device of the prior art and a thin film device of this invention under similar conditions.

GENERAL DESCRIPTION

The fundamental concept of this invention will best be understood by first describing the operation of the prior art device of Schaffert.

a. Schaffert Device

Figure 1:
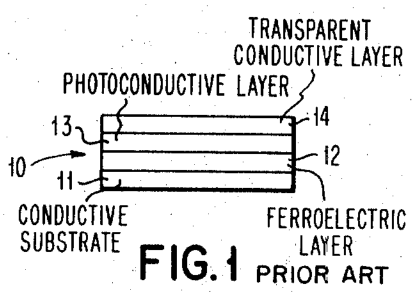
FIG. 1 PRIOR ART

Referring to the drawings, FIG. 1 shows (in cross section), a storage element consisting of laminar layers forming a memory or storage sandwich. As shown in FIG 1, the storage element is a plate member 10 having a conductive substrate 11 in electrical contact with a ferroelectric layer 12. A photoconductive layer 13 and in electrical contact with the ferroelectric layer 12 has a transparent conductive layer 14 superimposed on it. In the embodiment of FIG. 1, the various layers are continuous and each layer is in continuous physical and electrical contact with every portion of the surface of the adjacent layers.

While the storage element in FIG. 1 is a plate member 10, the storage element may take the form of a drum. In such case, the conductive substrate 11 takes the form of a conductive cylinder having a peripheral outer surface onto which the ferroelectric and other layers 12, 13, and 14 are superimposed. Such a drum, of course, could be part of a rotor assembly which could be rotatably mounted in a manner similar to the well known magnetic record drums.

The manufacture of the plate member 10 may be conducted in accordance to well known techniques. One form of plate member 10 would consist of a platinum coated sapphire substrate 11, a ferroelectric layer of $Pb_{0.92}Bi_{0.07}La_{0.01}(Fe_{0.405}Nb_{0.325}Zr_{0.27})O_3$, and a photoconductive layer of CdSe 13. In particular, solid solutions of lead ferroniobate, bismuth ferrate, lead zirconate and lanthanum ferrate are preferable ferroelectric materials. The photoconductive and the ferroelectric layers are of 1 $\mu$ thickness. The transparent conductive layer 14 can be extremely thin evaporated metal such as Au.

Suitable photoconductors are CdS, CdSe, ZnS, ZnSe and others. Suitable ferroelectrics include those described previously, and in the Chapman article.

The method whereby the plate member 10 of FIG. 1 (and its cylindrical counterpart) may be used for storing information may be understood by references to FIGS. 2*a–d*. In general the method of recording utilizes the fact that the photoconductive layer 13 is sensitive to light and the ferroelectric layer 12 is sensitive to changes in electric field. Input or read-in is accomplished by exposing the photoconductive layer 13 to light pulses which together with an applied voltage will produce polarization of the ferroelectric layer 12 in the selected areas exposed to the light pulses.

Figure 2A:
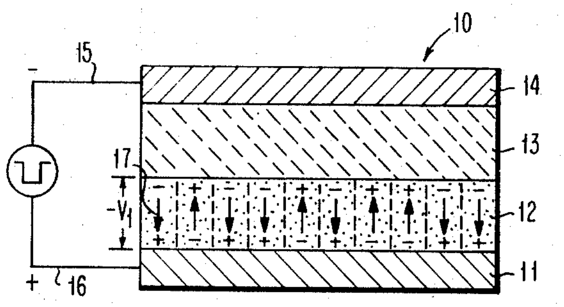
FIG. 2a PRIOR ART

The device operates as a light controlled voltage divider when an electric field is applied between the transparent electrode and the substrate electrode. If the capacitance of the ferroelectric layer is large compared to that of the photoconductor, and the dark resistance of the photoconductor is large compared to that of the ferroelectric, nearly all of the applied voltage always (under pulsed conditions, the photoconductor's dark resistance would not necessarily have to be larger than the resistance of the ferroelectric) appears across the photoconductor in the dark, and the ferroelectric layer 12 is not affected. In such condition the voltage applied across layer 12 is insufficient to polarize or switch domains therein. This is shown in FIG. 2*a*. The domains in ferroelectric layer 12 are polarized randomly.

Figure 2B:
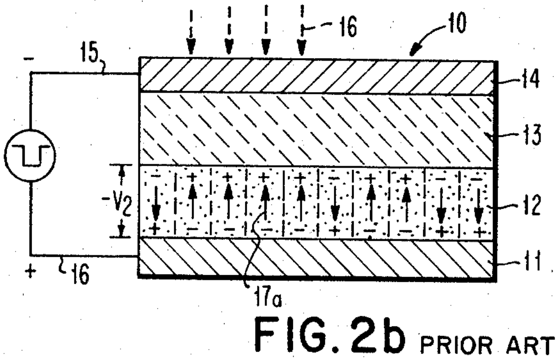
FIG. 2b PRIOR ART

In order to record or write in a bit of information, a sufficiently intense beam of light, as shown by broken arrows 16 in FIG. 2*b*, is incident on a small spot of the photoconductor 13 at the same time that a voltage pulse is applied as illustrated in FIG. 2*b*. The projection of the small spot of light onto the photoconductor 13 may be accomplished by a light spot from for example a CRT focused on the device by a lens. The resistance of the photoconductive layer 12 at that spot can be made small compared with the capacitive reactance of the photoconductor and the resistance of the ferroelectric at that spot. Then, at that spot only, the voltage pulse appears across the ferroelectric layer 13 if the pulse is long compared to the charging time constant of that small spot on the ferroelectric. If the applied voltage pulse is large enough and long enough, and if its polarity chosen properly, it reverses the polarization of the ferroelectric at the location where the light beam is incident on the photoconductor. This is indicated by the arrows 17*a* in FIGS. 2*b* and 2*c*.

After the recording step, the ferroelectric layer 12 will remain in the condition of selective polarization in areas where light pulses and voltage simultaneously occurred. This condition will persist even when the applied voltage pulse and/or light is removed. The selective polarization will continue to exist even with the application of reverse polarity voltage pulse so long as the photoconductive layer receives no photoenergy.

In the device, the readout of the stored bit is destructive, being accomplished by reversing the polarity of the stored bit. When the bit in the memory device switches its polarization, a transient current flows which can be detected in the circuit which includes leads 15 and 16. This phenomena provides the basis on which the readout is performed. In order to readout the domains which have been switched on read-in or record must be re-switched. To accomplish this, the polarity of the voltage pulse on the leads 15 and 16 is changed. The light beam is incident on the surface of the plate member 10 as indicated by broken arrows 16 in FIG 2*d*. As the beam impinges on the surface, the regions of photoconductive layer 13 are exposed to the photoenergy. Thus any localized area of layer 13 can have its resistance reduced. Coincident with light spot 16 a read-out voltage pulse is applied to 10. On the spots where the domains of ferroelectric layer 12 are not switched on readin due to the polarity of applied voltage, no switching of domains will occur. This will read out a "zero." In the spots having domains switched on read-in as shown by arrows 17*b* in FIG. 2*c*, these domains will be switched back giving a readout corresponding to "1." This readout destroys the written "1" which must then be rewritten in order to preserve the information. Each time a "1" is read out a current pulse corresponding to the information put in storage appears at the circuit of leads 15 or 16.

Figure 3:
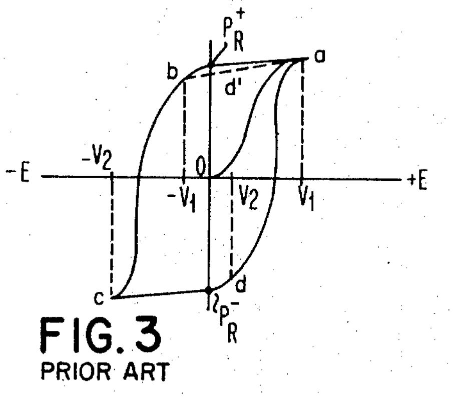
FIG. 3 PRIOR ART
FIG. 3 shows a hysteresis loop illustrating the physical principles obtained in accordance with the practice of the Schaffert invention.

The behavior of the ferroelectric layer 12 during the cycle of recording storage and readout can be understood by reference to FIG. 3. It will be seen that FIG. 3 shows a hysteresis loop which describes the state of polarization of the ferroelectric layer 12 as a function of the electric field imposed upon it.

In order to observe the behavior of the ferroelectric, consider a single spot. The state of the ferroelectric corresponding to the state *a* is labeled as a zero state. The state of the ferroelectric corresponding to *c* state in FIG. 3 is labeled "1." During a write "0" step a spot of light is incident on the photoconductor and on application of voltage pulse V on the device the polarization of the spot in layer 12 goes to point *a* due to imposition of voltage $V_1$. This amounts to writing a "0" in the device. When the photoenergy is removed and the applied voltage is reversed as shown in FIG. 2*a*, a smaller negative voltage $-V_1$ exists across layer 12. The polarization then traces the solid line curve of the hysteresis loop in FIG. 3 from *a* to *b*.

Figure 2C:
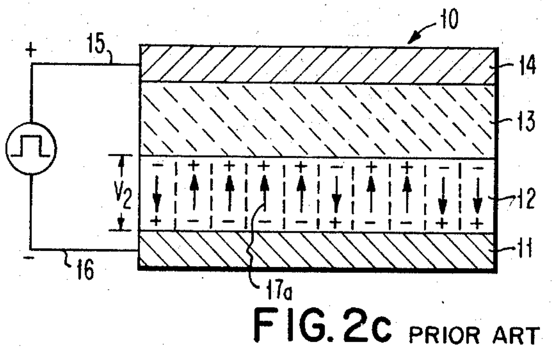
FIG. 2c PRIOR ART
Figure 2D:
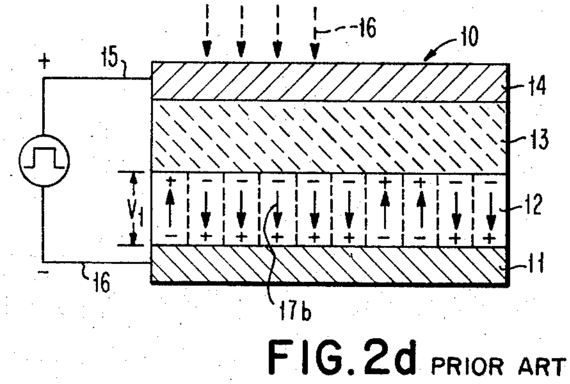
FIG. 2d PRIOR ART

Under the conditions illustrated by FIG. 2*b*, those domains of layer 12 in contact with areas of layer 13 exposed to light 16 experience a further increase in negative voltage $-V_2$. In those areas not radiated, layer 12 experiences voltage $-V_1$. In the area exposed to light pulses, the polarization in those areas then travels the path of hysteresis loop from *b* to *c*. This amounts to writing "1" in the device. Reversal of the applied voltage with the plate member 10 in darkness as shown in FIG. 2*c* produces a small positive voltage $V_2$ across layer 12. Polarization then follows the portion of the hysteresis loop from *c* to *d*. During the readout step as illustrated in FIG. 2*d*, under illumination the ferroelectric layer 12 undergoes a switching due to the increased positive voltage $V_1$ and polarization of the switched domains returns along the hysteresis loop from d to a. This amounts to reading "1" from the device. Those portions of the ferroelectric layer 12 between the "-bits" traverse the small loop in the upper portion of the hysteresis loop defined by the solid line *a—b* and the dotted line d′ during the above cycle. It will be seen that those domains between the bits remain essentially in one state of polarization. In the absence of applied voltage, the bits in the ferroelectric will be at either point $P_R^+$ or point $P_R^-$.

In physical detail, the ferroelectric photoconductor (FE/PC) storage device of Schaffert consists of four layers in electrical contact with each other: a metallized substrate, a ferroelectric film, a photoconductor film, and a transparent electrode on the top of the photoconductive film. For example, a typical thin film device may have the following dimensions and material composition: top electrode about 60 A of thin transparent film of Au; photoconductor, about 1 $\mu$ thick of CdSe; ferroelectric, about 1 $\mu$ thick of $Pb_{0.92}Bi_{0.07}La_{0.01}(Fe_{0.405}Nb_{0.325}Zr_{0.27})O_3$; conductive substrate, about 1 $\mu$ thick film of Pt. One mode of operation is in cathode ray tube (CRT)-accessed flying-spot stores, which are known in the art.

Figure 4:
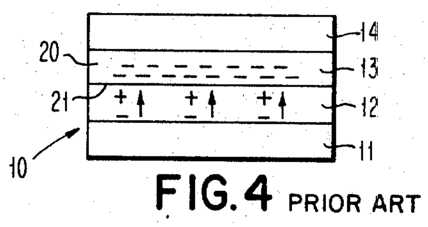
FIG. 4 PRIOR ART
FIG. 4 shows the space charge effect that occurs in the Schaffert element.
Figure 5:
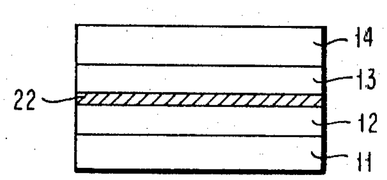
FIG. 5 shows the structure of the memory element of this invention.

The device as described by Schaffert does not operate as well as desired in thin film form, because of space charge layers 20 in the photoconductor near the interface 21 as shown in FIG. 4. The presence of these space charge layers can be visualized by noting that when the ferroelectric is polarized it has $P_R \approx 20 \times 10^{-6}$ coulombs/cm² surface charge density. In order to maintain the charge neutrality, a charge of about equal magnitude and opposite polarity appears in the photoconductor, as shown in FIG. 4. The density of carriers in the photoconductor is small (usually $10^{14}$/cm³ under illumination and $10^8$/cm³ in the dark). As a result, the charge neutrality in the photoconductor is altered over considerable distances in the photoconductor, about 0.4 micron distance under illumination, and 150 microns distance in the dark, or throughout the entire film. These space charge layers, especially in the dark photoconductor, give rise to a potential drop across the photoconductor. This voltage in the dark can be as large as 1.3 V. When no external voltage is applied to the device, this voltage in the space charge layers is also dropped across the ferroelectric. This may produce a field as large as $1.3 \times 10^4$ volts/cm in a direction to depolarize the ferroelectric if the ferroelectric is as thin as 1 micron. Due to the lack of true coercive field in the ferroelectric, this depolarization field may destroy the stored polarization.

THE INVENTION

The device of Schaffert also does not recognize the importance of the nature of contact the top electrode makes with the photoconductor for thin film embodiments. For such a thin film device, if the top electrode makes an ohmic contact to the photoconductor, then the device will not be able to take any disturb pulses in the dark because the space charge limited current in the dark through the photoconductor will switch the polarization. This results in a device which will not function satisfactorily in thin film form. On the other hand, if the contact is a blocking contact, then the time required for switching with light from a CRT will be very large. This is seen as follows: The CRT causes $10^{19}$ photons/cm²/sec. to impinge on the device. For a one micron photoconductor film this gives a generation rate of $10^{23}$ electron hole pairs/sec. Assume that the carriers which carry current are electrons and their lifetime is $10^{-6}$ seconds. This gives the steady state density of electrons to be $10^{17}$ electrons/cm³. Assume that hole lifetime is negligibly small so that their density is negligible. Also assume that total charge switched is 2 $P_R = 40\mu$ Coulombs/cm². Thus, the time required to switch this charge is $(40 \times 10^{-6})/(10^{17} \times 1.6 \times 10^{-19}) = 2.5 \times 10^{-3}$ sec. This is not as good as desired. However, if the photoconductor had a photoconductive gain of 100.0, then the time to switch the polarization will be reduced to 25 $\mu$ sec. As stated above, however, blocking contacts are imperative to make the thin film device disturb insensitive in the dark.

Thus, one of the main features of this invention entails depositing metal on the ferroelectric prior to the photoconductor deposition to eliminate the undesirable space charge layers. Since the metal has $10^{23}$ electrons/cm³, only a monolayer of the metal atoms is needed at the interface to provide enough charge at the interface to satisfy charge neutrality. As a result, the charge distribution in the photoconductor is not altered. Thus the space charge layers in the photoconductor are eliminated, as are the depolarization fields. Practically speaking, a continuous layer of metal at the FE/PC interface is not desired because it will cause interaction between two neighboring regions of stored information. Two methods are shown below to obtain a metallic layer with the desired effect at the interface.

A. Discontinuous Layer

In this method films of metal less than 100 A thick and preferably between 10 A – 100 A are discontinuous and form ideal metal films for the present purposes. The surface roughness of the ferroelectric also helps to make the films discontinuous. By discontinuous is meant non-electrically conducting in the plane parallel to the layers comprising the layered structure.

B. Continuous but Disconnected Islands

Figure 6:
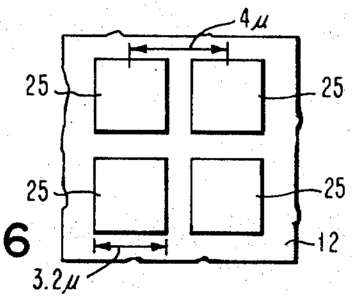
FIG. 6 shows the structure of an alternative embodiment of the memory element of this invention.

This method entails incorporating islands of continuous metal measuring for example, 3.2 micron × 3.2 micron, spaced 4 microns center to center, on the surface of the ferroelectric D as shown in FIG. 6. This provides about 64 percent coverage of the surface under a 25 mil diameter addressed spot on the device, in this example. This in some sense is preferable to that above as one can ensure that metal will be present at the interface after the processing of the device is finished. For case A, such control is difficult. If not carefully controlled, a thin layer of gold deposited on the ferroelectric may diffuse in either the ferroelectric or photoconductor during photoconductor deposition or subsequent processing.

While the addition of the discontinuous interface layer is the first distinguishing feature of this invention over Schaffert, a necessary relationship exists between the top electrode, photoconductor, and the discontinuous interface layer.

Thus, another of the main features of the invention entails providing the photoconductor film on the device with special blocking contacts on both surfaces. The nature of the contacts is such that they are blocking in the dark and yet giving photoconductive gain where light is shining on the photoconductor, as shown by the schematic diagram in FIGS. *7a* and *7b*. FIG. *7a* gives the energy band diagram for the device in the dark, showing metal region 70, barrier region 71, photoconductor 72, barrier 73, metal 74, ferroelectric 75 and metal 76. The line 77 represents the Fermi level. The blocking contacts at both ends of the device prevent the injection of the carriers from the contact. FIG. *7b* shows the energy band diagram for the device when the photoconductor is illuminated. The illumination of the contact causes shrinking of the barriers because of the available holes. As a result of shrinking, the carriers can be injected from the contact into the photoconductor and thus give photoconductive gain greater than 1.

The material to be selected for the interface as well as the top layer is such that it gives blocking contacts to the photoconductor. For CdSe photoconductor, the materials chosen include Au, Pt, Ag and Cu. These metals form blocking contacts to CdSe. The blocking contact is obtained because of the high density of surface states present in the middle of the forbidden gap in CdSe as indicated in the literature. However, metals like Ga, In, Al, etc., diffuse in the surface of CdSe and dope it n-type and make the surface barrier narrow which permits tunnelling of electrons from the metal to give an ohmic contact to the CdSe. Thus, these (In, Al, Ga) contact type materials are to be avoided.

Thus, the metals chosen should be non +3 valence metals in conjunction with a photoconductor chosen from the group consisting of II–VI and III–V compounds.

EXAMPLE

Several FE/PC devices were made with the discontinuous Au film at the interface and transparent gold contact on top of the photoconductor. These show retention and disturb insensitivity, for example, retention for at least 63 hours and disturb insensitivity for at least $10^7$ disturbs. A brief method for the preparation of these devices is as follows. The ferroelectric is centrifugally deposited, pressed and sintered on a gold-covered nickel-chrome alloy substrate. A discontinuous layer of gold having high lateral resistivity is evaporated on the ferroelectric. A photoconductor is evaporated on this substrate. A set of transparent gold dots is evaporated on the photoconductor.

The switching of the polarization was detected by applying bipolar pulses and measuring the charge switched onto a capacitor in series with the device when light from a He-Ne laser is incident on the device. The charge switched for the device with a drive voltage +5 V and 6 $\mu$ sec. duration and −6 V and 7 $\mu$ sec. is 25 pico-Coulombs. The polarization switched irreversibly in the dark was small. The device was tested to see its ability to retain information. The information was retained in excess of 63 hours. A bit pattern of 10101 was written on the device using coincident pulses of light and voltage. The device was subjected to $10^7$ read-write pulses in the dark. This resulted in minimal deterioration of the stored polarization. By contrast, attempts to make thin film devices with the top electrode as ohmic contacts resulted in considerable switching of the polarization in the dark.

It is important to emphasize that both at the interface and the top surface of the photoconductor the metal contacts should be blocking to prevent the alteration of stored polarization in the ferroelectric in the dark.

For thin film devices without this discontinuous gold layer at the interface, the charge switched with positive polarity (on the transparent electrode) is much smaller than with the negative polarity.

It should also be noted that the presence of the discontinuous Au layer at the interface has a result of partially removing the asymmetry in the charge switched. FIG. 8 shows a typical wave form of charge switched in a thin film device with bipolar pulses using the method of detection mentioned above. A similar wave for a thin film device with the discontinuous layer is shown in FIG. 9 where most of the asymmetry is removed. It has been found that any residual asymmetry in these films may be minimized by heat treatment in air for 15 minutes to 30 minutes at 350° F.

In more generic terms, the top electrode, photoconductor and discontinuous interface layer are related as follows:

The top electrode and the interface layer act as blocking contacts to the photoconductor in the dark. Under illumination, the barriers at the top electrode and the interface layer shrink permitting injection of the electron in or out of photoconductor resulting in pulsed photoconductive gain of greater than unity.

The advantages of the memory element of this invention over that shown in Schaffert, may be summarized as follows: First, presence of the blocking contacts on the photoconductor prevents the flow of space charge limited currents in the photoconductor under no illumination preventing the disturbance of the unaddressed bits in the device, consequently, making the device relatively disturb insensitive. Second, under illumination the barriers at the photoconductor shrink resulting in injection of electrons into and out of the photoconductor giving the photoconductor pulsed gain greater than unity. This results in a reduction of the time for which read or write pulses must be applied in order to switch the polarization in the ferroelectric.

The Schaffert patent shows many apparatus configurations. For brevity, applicant has incorporated the Schaffert specification into this application. All the devices shown in Schaffert are fully operable, but with improved results, especially in thin film devices, by the direct substitution of this memory element for the Schaffert structure.

While applicant has shown specific examples above, others skilled in the art will recognize the scope of applicant's invention, and the various apparatus in which it may be used.

What is claimed is:

1. A photoelectric data recording apparatus comprising:

a memory element having a top conductive electrode in electrical contact with a first layer of photoconductive and electroluminescent material in electrical contact with a discontinuous interface layer in electrical contact with a second layer of ferroelectric material in electrical contact with a conductive substrate, said top electrode and said discontinuous interface layer being blocking contacts with said photoconductor in the dark and injecting in the light;

means for applying unidirectional voltage pulses of first and second polarities across said stacked layers, said voltage pulses being of a magnitude incapable of switching domains of said ferroelectric material in darkness but capable of switching the polarity of domains of said ferroelectric layer coincidentally with the radiation of said photoconductive and electroluminescent layer;

means for energizing said first layer with radiant energy capable of switching the resistance thereof to produce a luminescence therein in response to the switching of domains in said second layer; and means operable for coordinating the application of said potentials and said radiant energy means for producing the switching of domains in said second layer in accordance with a predetermined pattern indicative of data to be recorded.

2. A photoelectric data recording apparatus comprising:

a memory element having successively electrically contacting layers of a conductive substrate, ferroelectric material, discontinuous interface layer, photoconductor and top conductive electrode, said top electrode and said discontinuous interface layer being blocking contacts with said photoconductors in the dark and injecting in the light;

means for applying unidirectional voltage pulses of first and second polarities across said layers, said potentials being of a magnitude incapable of switching domains of said ferroelectric layer in darkness but capable of switching the polarity of domains of said ferroelectric layer coincidentally with the radiation of said photoconductive layer;

means for energizing said photoconductive layer with radiant energy capable of switching said photoconductive layer from a non-conducting to a conducting state; and means operable for coordinating said pulse applying means and said radiant energy means for producing a read-in switching of domains in said ferroelectric layer in accordance with a predetermined data pattern;

means for effecting a relative movement of said memory element and said radiant energy means; and said coordinating means selectively operating said radiant energy means coincidentally with the application of said voltage pulse and in timed relation with said relative movement.

3. A photoelectric data recording apparatus in accordance with claim 2 which further comprises storage readout means including means for applying a voltage pulse of said second polarity across said memory element, means for scanning said photoconductive layer of said memory element with a constant beam from said energizing means coincidentally with the application of said potential of said second polarity, means for sensing electric pulses generated by domains switched in said ferroelectric layer, and output means responsive to said sensing means for recording said domain pulses in another form.

4. A photoelectric data recording apparatus comprising:

a memory element having successively electrically contacting layers of a conductive substrate, ferroelectric material, discontinuous interface layer, photoconductor and top conductive electrode, said top conductive electrode and said discontinuous interface layer being blocking contacts with said photoconductor in the dark and injecting in the light, means for applying unidirectional potentials of first and second second polarities across said layers comprising electrode means in contact with the exposed surface of said superposed layers, said potentials being of a magnitude incapable of switching domains of said ferroelectric material in darkness but capable of switching the polarity of the domains of said ferroelectric layer coincidentally with the radiation of said photoconductor layer, said electrode means in contact with said photoconductive layer being transparent and adapted to form plural recording tracks in said memory element, said means for applying said potentials further including a reversible polarity switching means connectable to said electrode means;

means for energizing said photoconductive layer with radiant energy capable of switching said photoconductor layer from a non-conducting to a conducting state, said energizing means including means for generating plural beams of radiant energy onto said photoconductive layer in the regions of said plural recording tracks provided by said transparent conductive electrode means; and means operable for coordinating the application of said potentials and said radiant energy means including means for selectively pulsing said beam generating means in accordance with a predetermined pattern whereby parallel domains are switchable in plural record tracks in said ferroelectric layer of said memory element.

5. A photoelectric data apparatus in accordance with claim 4 in which said photoconductive layer is formed of an electroluminescent phosphor and said radiant energy means generates ultraviolet radiation.

6. A photoelectric data apparatus in accordance with claim 4 in which said energizing means includes means for producing plural beams of said radiant energy for projection onto one or more track regions of said memory elements, and said coordinating means includes means for selectively operating said beam producing means in accordance with a predetermined multiple bit data pattern.

7. A photoelectric data apparatus in accordance with claim 4 further comprising read-out means including means operable for sensing luminescent pulses producible in said photoconductive layer in response to switching of domains in said ferroelectric layer.

8. A photoelectric data recording apparatus comprising:

a memory element having successively electrically contacting layers of a conductive substrate, ferroelectric material, discontinuous interface layer, photoconductor and top conductive electrode, said top electrode and said discontinuous interface layer being blocking contacts with said photoconductor in the dark and injecting in the light;

means for applying unidirectional voltage pulses of first and second polarities across said layers, said potentials being of a magnitude incapable of switching domains of said ferroelectric layer in darkness but capable of switching the polarity of domains of said ferroelectric layer coincidentally with the radiation of said photoconductive layer;

means for energizing said photoconductive layer with radiant energy capable of switching said photoconductive layer from a non-conducting to a conducting state; and means operable for coordinating said potential applying means and said radiant energy means for producing the switching of domains in said ferroelectric layer in accordance with a predetermined data pattern including means for effecting a relative movement of said memory element and said radiant energy means; and means for selectively operating said radiant energy means in timed relation with said relative movement.

9. A photoelectric data recording apparatus in accordance with claim 8 in which said energizing means includes means for producing a radiant energy beam projectable onto the photoconductive layer of said memory element, and said means for effecting relative movement includes means for directing said beam projecting means along said photoconductive layer in a single recording track region, and said means for selectively operating said radiant energy means includes means for producing a series of beam pulses in timed relation with said relative movement in accordance with a series multiple bit data pattern.

10. The memory element of claim 8 wherein said top electrode and discontinuous interface layer are chosen from non +3 valence metal and said photoconductor is chosen from the II–VI compounds and III–V compounds.

11. The memory element of claim 8 wherein said top electrode and said discontinuous interface layer are individually chosen from the group consisting of Au, Pt, Ag, and Cu, and said photoconductor is chosen from the group consisting of II–VI and III–V compounds.

12. The memory element of claim 8 wherein said discontinuous interface layer is a metal film between 10–100 A thickness and non-electrically conducting in the plane parallel to the layers comprising said memory element.

13. The memory element of claim 8 wherein said discontinuous interface layer comprises a series of islands physically isolated from each other, each of said islands being smaller in area than the area of the light beam used to address said memory element.

14. The memory element of claim 8 wherein said ferroelectric material is a solid solution of lead ferroniobate, bismuth ferrate, lead zirconate and lanthanum ferrate.

15. The memory element of claim 14 wherein said element is heat treated to reduce asymmetry in switching characteristics.

* * * * *